(12) United States Patent
Millier et al.

(10) Patent No.: US 11,572,889 B2
(45) Date of Patent: Feb. 7, 2023

(54) BLADE PIVOT OF ADJUSTABLE ORIENTATION AND OF REDUCED BULK FOR A TURBOMACHINE FAN HUB

(71) Applicant: SAFRAN AIRCRAFT ENGINES, Paris (FR)

(72) Inventors: Vincent François Georges Millier, Moissy-Cramayel (FR); Caroline Marie Frantz, Moissy-Cramayel (FR); Gilles Alain Marie Charier, Moissy-Cramayel (FR); Olivier Belmonte, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 0 days.

(21) Appl. No.: 17/432,682

(22) PCT Filed: Jan. 31, 2020

(86) PCT No.: PCT/FR2020/050164
§ 371 (c)(1),
(2) Date: Aug. 20, 2021

(87) PCT Pub. No.: WO2020/169896
PCT Pub. Date: Aug. 27, 2020

(65) Prior Publication Data
US 2022/0018357 A1    Jan. 20, 2022

(30) Foreign Application Priority Data

Feb. 22, 2019 (FR) ........................... 1901823

(51) Int. Cl.
*F04D 29/32* (2006.01)
*F01D 7/00* (2006.01)
(Continued)

(52) U.S. Cl.
CPC ............ *F04D 29/323* (2013.01); *B64C 11/06* (2013.01); *F01D 7/00* (2013.01); *F04D 29/362* (2013.01);
(Continued)

(58) Field of Classification Search
CPC ........ F04D 29/323; F04D 29/362; F01D 7/00; F01D 7/02; F05D 2260/74;
(Continued)

(56) References Cited

U.S. PATENT DOCUMENTS 2,116,818 A * 5/1938 Austin .................. B64C 11/325
                                                      416/157 R
2,499,837 A    3/1950 Sheets et al.
(Continued)

FOREIGN PATENT DOCUMENTS

EP    3 078 588 A1    10/2016
FR    3 046 403 A1    7/2017
GB       640852 A *   7/1950    ............. B64C 11/06

OTHER PUBLICATIONS

International Search Report dated May 20, 2020 in PCT/FR2020/050164 filed Jan. 31, 2020, 2 pages.
(Continued)

*Primary Examiner* — Christopher Verdier
(74) *Attorney, Agent, or Firm* — Oblon, McClelland, Maier & Neustadt, L.L.P.

(57) ABSTRACT

A blade pivot of adjustable orientation for a turbomachine fan hub includes: a block having a retaining device configured to retain a fan blade root and a coupling device for the transmission of a torque; a ball type rolling bearing for taking up centrifugal forces having an inner ring; a clamping nut screwed onto an external thread of the block in order to clamp the inner ring of the ball type rolling bearing for taking up centrifugal forces to the block; a rolling bearing
(Continued)

for taking up transverse forces; a pitch setting transmission ring positioned inside the inner radial end of the block and equipped with a coupling device cooperating with the coupling device of the block, and a device for locking the pitch setting transmission ring on the block.

11 Claims, 3 Drawing Sheets

(51) Int. Cl.
*F04D 29/36* (2006.01)
*B64C 11/06* (2006.01)
*B64C 11/36* (2006.01)

(52) U.S. Cl.
CPC ........ *B64C 11/36* (2013.01); *F05D 2220/323* (2013.01); *F05D 2220/36* (2013.01); *F05D 2240/54* (2013.01); *F05D 2260/74* (2013.01); *F05D 2260/79* (2013.01); *Y10T 29/497* (2015.01); *Y10T 29/4932* (2015.01); *Y10T 29/49696* (2015.01)

(58) Field of Classification Search
CPC . F05D 2260/79; F05D 2240/54; B64C 11/06; B64C 11/32; B64C 11/325; B64C 11/36; Y10T 29/49696; Y10T 29/497; Y10T 29/4932
See application file for complete search history.

(56) References Cited

U.S. PATENT DOCUMENTS

| | | | |
|---|---|---|---|
| 5,015,150 | A | 5/1991 | Rohra |
| 6,015,264 | A * | 1/2000 | Violette ............... B64C 11/20 |
| | | | 416/207 |
| 2016/0290228 | A1 | 10/2016 | van der Merwe et al. |
| 2019/0010957 | A1 | 1/2019 | Belmonte et al. |

OTHER PUBLICATIONS

Preliminary French Search Report dated Oct. 10, 2019 in French Patent Application No. 1901823 filed Feb. 22, 2019, 3 pages (with Translation of Category).

* cited by examiner

BLADE PIVOT OF ADJUSTABLE ORIENTATION AND OF REDUCED BULK FOR A TURBOMACHINE FAN HUB

TECHNICAL FIELD

The present invention relates to the general field of turbomachines equipped with one or two fan(s), shrouded or not shrouded, and more particularly to controlling the orientation of the fan blades of these turbomachines.

One privileged application field of the invention is that of turbojets comprising a fan with a very high bypass ratio (large fan diameter) and with a very low pressure ratio.

PRIOR ART

The operability of a turbojet at a very high bypass ratio is ensured by introducing variability into the low-pressure module of the turbojet, this variability being activated depending on the flight phases to restore a sufficient pumping margin.

It is known to ensure the variability by a system of changing the pitch setting of the fan blades which is integrated with the hub of the fan. A blade pitch setting change system of this type also allows providing the thrust reversal function which, with this type of turbojet, is no longer accomplished by the nacelle of the engine.

Moreover, in the fan module of a turbojet with a very high bypass ratio, the radial retention of the fan blades is generally provided by the shape of the blade root and of the socket that receives it, by a pivot and its rolling bearings for taking up the forces to which the blade is subjected, by the fan hub in which all the pivots are integrated, and by the fan casing.

It is possible for example to refer to publication FR 3,046,403 which describes architecture for retaining fan blades of this type. More precisely, in this publication, the radial retention of each blade consists of a pivot comprising an attachment in the form of a bulb, of two ball type rolling bearings which allow taking up the aerodynamic, inertial and centrifugal forces to which the blade and its pivot are subjected, and an eccentric connected by grooves to the pivot, and by a hub integrating all the pivots.

With such architecture, the dimension of the hub of the fan depends directly on the integration of the pitch change mechanism of the blades, but also on the size of the rolling bearings of each pivot.

In fact, in the configuration described in publication FR 3,046,403, the inner rolling bearing takes up all the centrifugal forces seen by the blade and its pivot. To minimize the transverse forces to be taken up by this bearing, the inner and outer rolling bearings are radially spaced far from one another. The inner radial bearing is therefore not only the larger bearing, but it is also placed on a very low radius of the hub so that the tangential space between the inner rolling bearings of two adjacent blades is very restrained. The diameter of the fan hub is consequently impacted by it.

However, to optimize the efficiency of a very high bypass ratio turbojet, it is desired to minimize the diameter of the fan hub and/or to integrate a greater number of blades with the same size hub.

DISCLOSURE OF THE INVENTION

The present invention therefore has as its main goal to propose an architecture of the pivots and of their rolling bearings which is less bulky.

In conformity with the invention, this goal is achieved by means of a blade pivot of adjustable orientation for a turbomachine fan hub comprising:
- a block having retaining means at an outer radial end configured to retain a fan blade root and coupling means at an inner radial end for the transmission of a torque;
- a ball type rolling bearing for taking up centrifugal forces having an inner ring mounted in transverse support against an outer radial portion of the block;
- a clamping nut screwed onto an external thread of the block in order to clamp the inner ring of the ball type rolling bearing for taking up centrifugal forces on the block;
- a rolling bearing for taking up transverse forces having an inner ring mounted in transverse support against an inner radial portion of the block;
- a pitch setting transmission ring positioned inside the inner radial end of the block and equipped with coupling means cooperating with the coupling means of the block; and
- means for locking the pitch setting transmission ring on the block.

The invention is remarkable in that it proposes a ball type rolling bearing having four contact points which is positioned as far as possible radially from the engine axis to take advantage of a maximum of room and thus be dimensioned to take up the centrifugal forces seen by the blade and its pivot. As for transverse forces, smaller than the centrifugal forces, they are taken up by a needle or roller rolling bearing which allows accurate guiding and an improvement in compactness.

The result of the compactness of the rolling bearings is that it is possible to reduce the diameter of the hub of the fan and/or, at the same hub diameter, to integrate a greater number of fan blades on it.

Moreover, the greater compactness of the pivot according to the invention makes it lighter than the pivots of the prior art, particularly than that described in publication FR 3,046,403, which reduces the mass subjected to centrifugal forces.

The pivot according to the invention is also more reliable because the centrifugal forces seen by the blade and its pivot are taken up by a nut and no longer by two half-rings requiring greater accuracy in machining as described in the prior art.

Finally, the fact of integrating the pitch setting transmission ring inside the radial end of the block frees room radially and tangentially, which allows limiting the integration constraints on the pitch change system inside the inner radial end of the block.

The rolling bearing for taking up transverse forces comprises an outer ring configured to be mounted in transverse support inside a fan hub, the inner and outer rings defining the rolling paths for a plurality of rolling elements.

Likewise, the ball type rolling bearing for taking up the centrifugal forces comprises an outer ring intended to be mounted in transverse support inside a fan hub, the inner and outer rings defining rolling paths for a plurality of balls.

In this case, the pivot can also comprise a second clamping nut configured to be screwed onto an internal thread of the hub in order to clamp against it respective outer rings of the ball type rolling bearing for taking up centrifugal forces and of the rolling bearing for taking up transverse forces.

Preferably, the outer ring of the rolling bearing for taking up transverse forces comprises a flexible flange. Such flexibility in the outer ring of this bearing has the advantage of preventing the propagation of vibrations in the rest of the pitch setting system during flight events such as impacts on the fan blades by external elements.

The rolling elements of the rolling bearing for taking up transverse forces can be needles or rollers.

Also preferably, the inner ring of the ball type rolling bearing for taking up centrifugal forces is produced in two distinct portions in order to facilitate the assembly of the pivot.

The inner ring of the rolling bearing for taking up transverse forces can be shrink-fit on the pivot.

The invention also has as its object a blade with a variable pitch angle for a turbomachine fan hub, comprising an aerodynamic profile and a pivot as defined previously.

The invention also has as its object a turbomachine comprising at least one fan hub and at least one set of blades with a variable pitch angle as defined previously.

The invention also has as its object a method for mounting a pivot in a fan hub as previously defined, comprising in succession: lowering the pivot into a fan; clamping the ball type rolling bearing for taking up the centrifugal forces by screwing the nut into the external thread of the pivot; mounting the rolling bearing for taking up transverse force on the inner radial end of the pivot; mounting the pitch setting transmission ring inside the inner radial end of the block; and locking said pitch setting transmission ring on the block.

DESCRIPTION OF THE EMBODIMENTS

The invention applies to any turbomachine equipped with at least one shrouded or unshrouded fan, the fan blades of which (in the case of a shrouded fan) or the propeller blades (in the case of a non-shrouded fan) are equipped with a pitch setting system.

The invention applies in particular to turbojets of the type comprising a fan with a very high bypass ratio (large fan diameter) and with a very low pressure ratio.

The architecture of these types of turbojets is well known to a person skilled in the art and will therefore not be described in detail here. Briefly, these turbojets comprise a shrouded fan with a large diameter which is equipped with a fan blade pitch setting change system. Briefly, these turbojets comprise a large diameter shrouded fan which is equipped with a pitch setting change system of the blades of the fan.

A pitch setting change system of this type can for example comprise lever arms (or eccentrics) coupled to each blade pivot and actuated in pivoting by a jack.

More precisely, the pivot of each blade has as its function to ensure the retention of the fan blade on a rotating fan hub and guiding it for setting its pitch.

To this end, the pivot of each fan blade is mounted radially in an opening of the fan hub which it passes through from side to side, the hub being centered on the longitudinal axis of the turbojet.

Figure 1:
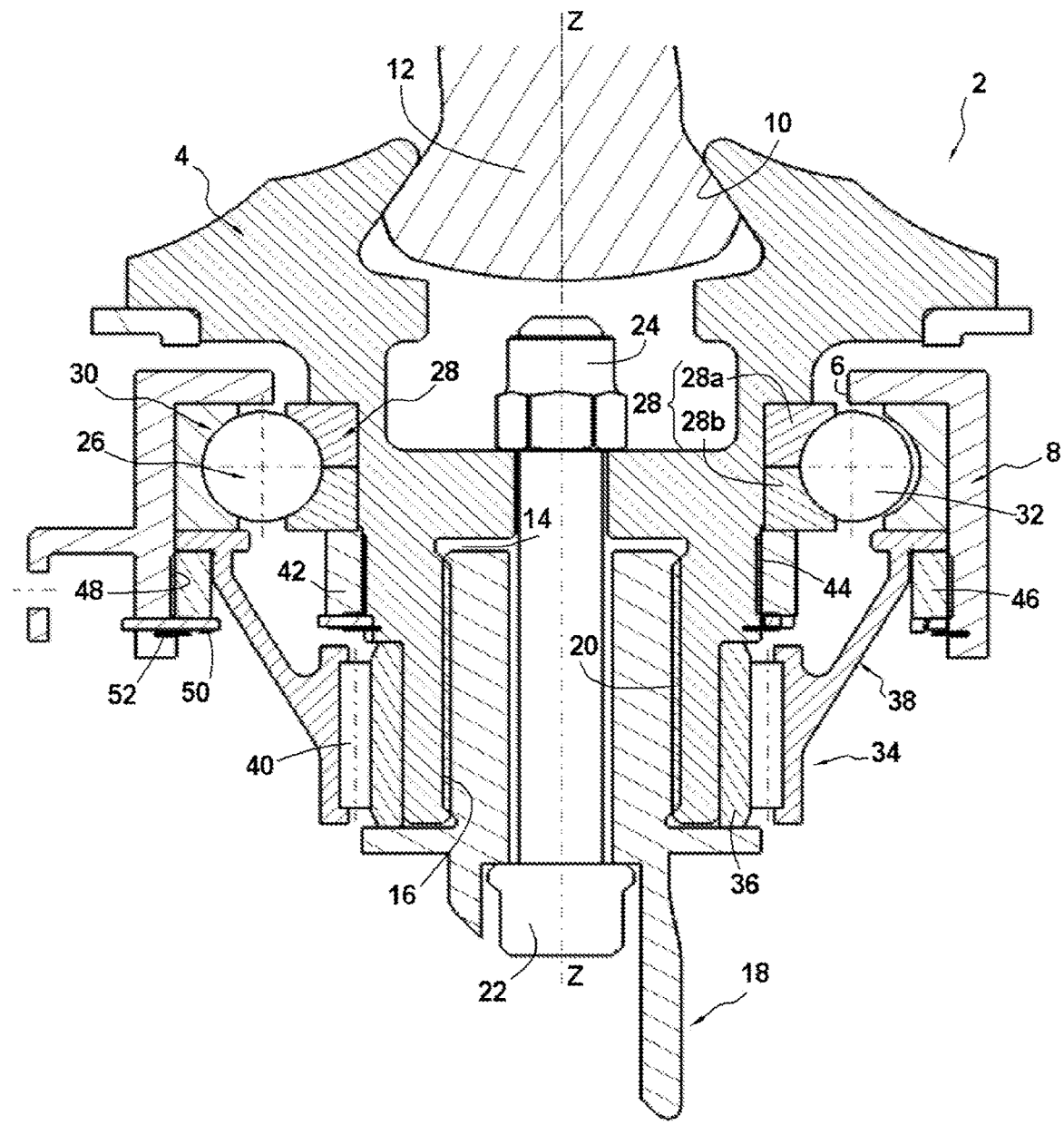
FIG. 1 is a section view showing an adjustable orientation blade pivot according to one embodiment of the invention.

As shown in FIG. 1, the pivot 2 of the fan blade according to the invention comprises several distinct elements which are assembled together so as to facilitate its assembly to/disassembly from the hub of the propeller.

In particular, the pivot 2 comprises a block 4 which extends along the radial axis Z-Z of the pivot through an opening 6 of the hub 8 of the fan. This block 4 has, at one outer radial end (i.e. at its most distant end from the longitudinal axis of the turbojet), an attachment 10 in the form of a bulb which is intended to receive a root 12 of the fan blade. Of course, other blade root retaining means could be contemplated.

At its inner radial end (i.e. at its closest end to the longitudinal axis of the turbojet), the block 4 comprises an opening 14 centered on the radial axis Z-Z and intended to receive a pitch setting transmission ring.

Moreover, the opening 14 is equipped with inner grooves 16 for transmitting a torque. Of course, other coupling means for transmitting a torque can be contemplated.

The pivot according to the invention also comprises a pitch setting transmission ring 18 (also called an eccentric) which is positioned in the opening 14 of the block and coupled to the latter by means of grooves 20 carried on its outer surface and cooperating with the inner grooves 16 of the opening.

This pitch setting transmission ring 18 is intended to transmit the torque to the blade pivot to change its pitch setting. It is locked on the block by means of a screw 22 centered on the radial axis Z-Z and by a nut 24 clamped on said screw. The pitch setting transmission ring also allows locking the inner ring of the rolling bearing for taking on transverse forces supported against the inner portion of the block.

The pivot according to the invention also comprises rolling bearings for taking up centrifugal forces (i.e. along the radial axis Z-Z) and transverse forces (i.e. along a plane perpendicular to the radial axis Z-Z) seen by the blade and its pivot.

More precisely, the pivot according to the invention comprises a ball type rolling bearing 26 which is intended to take up centrifugal forces. This ball type rolling bearing 26 is equipped with an inner ring 28 which mounted in transverse support against the outer radial end of the block 4.

Preferably, the inner ring 28 is formed of two distinct portions 28a, 28b. This feature allows facilitating the assembly of the pivot as will be detailed hereafter.

This ball type rolling bearing 26 also comprises an outer ring 30 which is mounted in transverse support inside the opening 6 of the fan hub 8, the inner 28 and outer 30 rings defining rolling paths for a plurality of balls 32.

To take up transverse forces, the pivot according to the invention comprises needle or roller type rolling bearing 34 which is offset radially toward the interior relative to the ball type rolling bearing 26.

More precisely, this needle or roller type rolling bearing 34 comprises an inner ring 36 which is mounted in transverse support against the inner radial end of the block 4. This inner ring 36 can for example be shrink-fit on the block.

The needle or roller type rolling bearing 34 also comprises an outer ring 38 which is mounted in transverse support inside the opening 6 of the fan hub 8, the inner 36 and outer 38 rings defining rolling paths for a plurality of needles or rollers 40.

A first clamping nut 42 is screwed onto an external thread 44 of the block 4 in order to clamp the inner ring 28 of the rolling bearing for taking up centrifugal forces 26 on the block.

A second clamping nut 46 is screwed onto an internal thread 48 of the hub 8 to provide clamping against it of the respective outer rings 30, 38 of the rolling bearing for taking up centrifugal forces and of the rolling bearing for taking up transverse forces.

Figure 2:
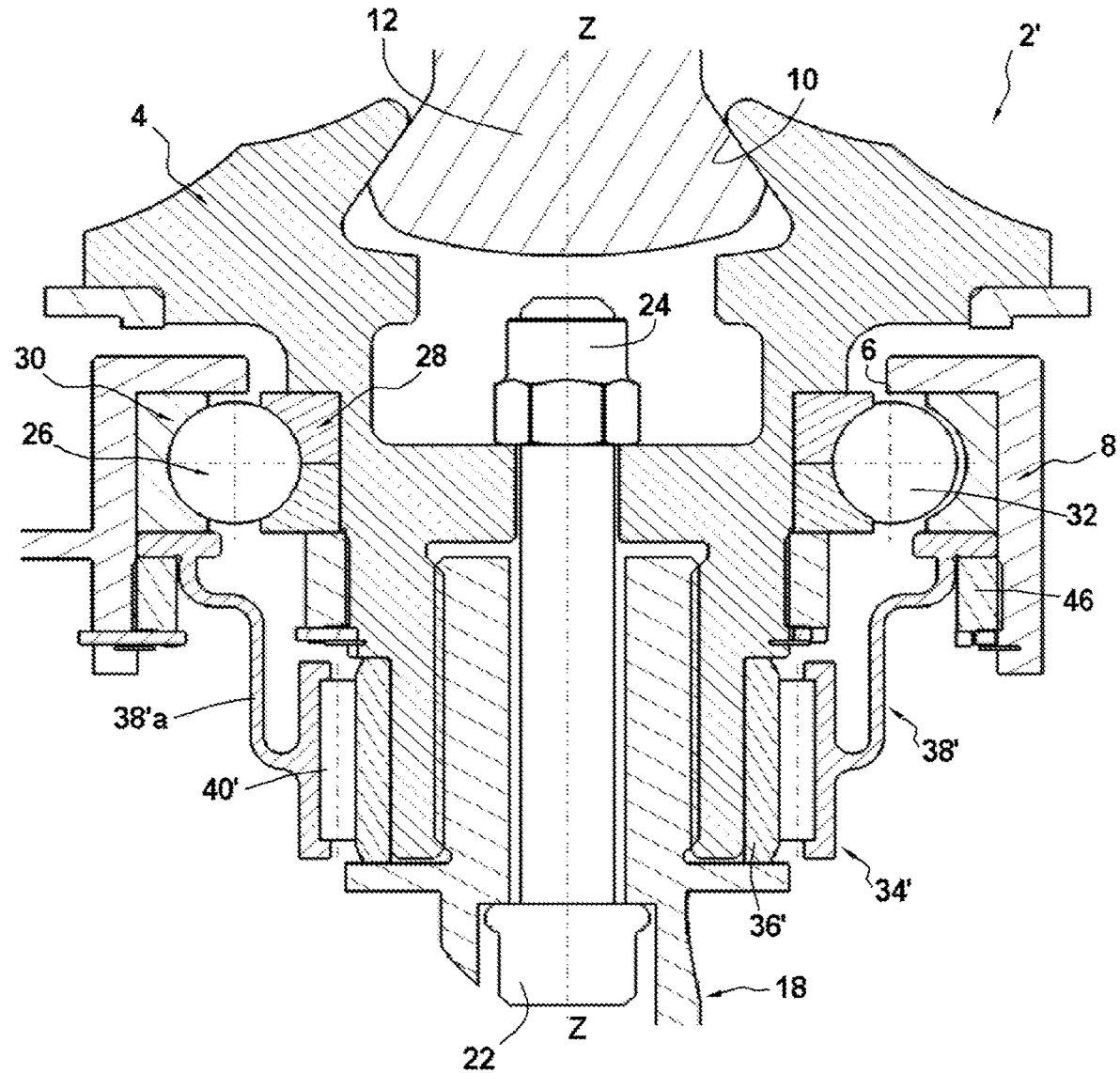
FIG. 2 is a section view showing an adjustable orientation blade pivot according to another embodiment of the invention.

FIG. 2 shows a variant embodiment of the pivot according to the invention.

This variant is distinguished from the embodiment previously described in that the outer ring 38' of the needle or roller rolling bearing 34' has, between its portion defining the rolling paths and its portion supported transversely inside the opening 6 of the fan hub 8, a flexible flange 38'a.

This flexible flange 38'a has the advantage of conferring on the outer ring 38' a flexibility allowing it to prevent the propagation of vibrations into the rest of the pitch setting system during flight events such as impacts on the fan blades by external elements. It can be obtained in several fashions: by giving it a crenelated shape, by reducing its thickness between its two ends or by using a more flexible material.

In connection with FIGS. 3A to 3F, an example of assembly of the pivot according to the invention will now be described.

During a first step illustrated by FIG. 1A, the outer ring 30 of the ball type rolling bearing is mounted in transverse support inside the opening 6 of the fan hub 8 (it is shrink-fit for example), then the balls 32 of this rolling bearing are assembled.

Figure 3A:
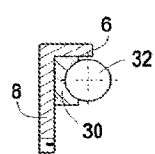
FIGS. 3A to 3F show an example of assembly of a pivot according to the embodiment of FIG. 1.
Figure 3B:
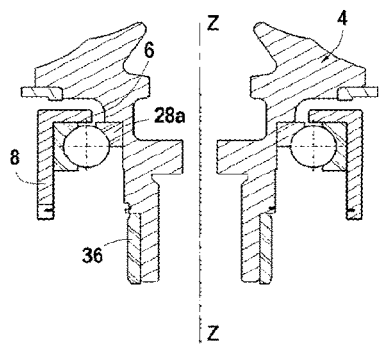

As shown in FIG. 3B, the block 4 is then lowered radially into the opening 6 of the hub 8, the block previously being pre-equipped with a portion 28a of the inner ring of the ball type rolling bearing and of the inner ring 36 of the needle or roller rolling bearing (these rings 28a, 36 being shrink-fit for example).

Figure 3C:
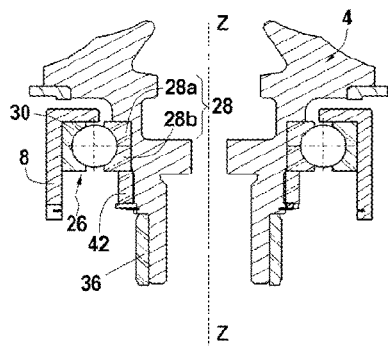

The other portion 28b of the internal ring of the ball type rolling bearing 26 is then mounted to form the inner ring 28, the latter being held by clamping the first locking nut 42 (FIG. 3C).

Figure 3D:
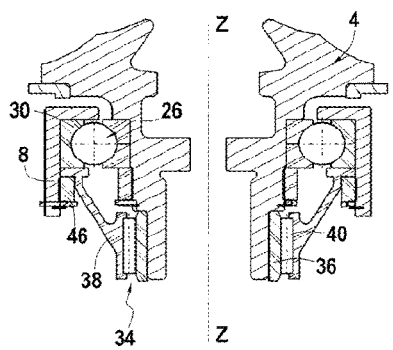

The needles or rollers 40, as well as the outer ring 38 of the needle or roller rolling bearing 34 are then mounted. The respective outer rings 30, 38 are then locked by clamping the second locking nut 46 (FIG. 3D).

The second locking nut 46 can itself be locked into position by means of an anti-rotation ring 50 and an elastic clamping ring 52 of the "circlip" type for example (see FIG. 1).

Figure 3E:
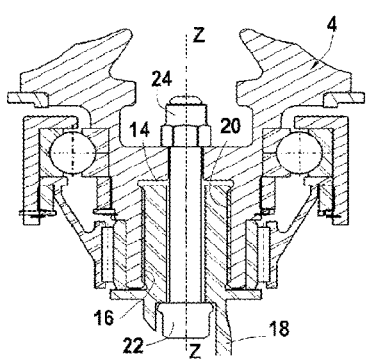

During the following step illustrated by FIG. 3E, the pitch setting transmission ring 18 is mounted inside the opening 14 provided in the block 4 by causing their respective grooves 16, 20 to cooperate. The pitch setting transmission ring is then locked by mounting the screw 22 and clamping the nut 24.

Figure 3F:
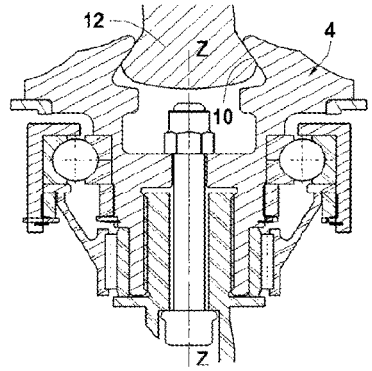

Finally, as shown in FIG. 3F, the root 12 of the blade can be mounted in the attachment 10 in the form of a bulb provided at the outer radial end of the block 4.

The invention claimed is:

1. A blade pivot of adjustable orientation for a turbomachine fan hub comprising:
    a block having retaining means at an outer radial end configured to retain a fan blade root and coupling means at an inner radial end, for the transmission of a torque;
    a ball rolling bearing for taking up centrifugal forces having an inner ring mounted in transverse support against an outer radial portion of the block;
    a clamping nut screwed onto an external thread of the block in order clamp the inner ring of the ball rolling bearing for taking up centrifugal forces on the block;
    a rolling bearing for taking up transverse forces having an inner ring mounted in transverse support against an inner radial portion of the block;
    a pitch setting transmission ring positioned inside the inner radial end of the block and equipped with coupling means cooperating with the coupling means of the block; and
    means for locking the pitch setting transmission ring on the block.

2. The blade pivot according to claim 1, wherein the rolling bearing for taking up the transverse forces comprises an outer ring configured to be mounted in transverse support inside the turbomachine fan hub, the inner ring and the outer ring of the rolling bearing defining the rolling paths for a plurality of rolling elements.

3. The blade pivot according to claim 2, wherein the ball rolling bearing for taking up centrifugal forces comprises an outer ring to be mounted in transverse support inside the turbomachine fan hub, the inner ring and the outer ring of the ball rolling bearing defining the rolling paths for a plurality of balls.

4. The blade pivot according to claim 3, further comprising a second clamping nut configured to be screwed onto an internal thread of the turbomachine fan hub in order to clamp the turbomachine fan hub against it the respective outer rings of the ball rolling bearing for taking up centrifugal forces and of the rolling bearing for taking up transverse forces.

5. The blade pivot according to claim 2, wherein the outer ring of the rolling bearing for taking up transverse forces comprises a flexible flange.

6. The blade pivot according to claim 2, wherein the rolling elements of the rolling bearing for taking up transverse forces are needles or rollers.

7. The blade pivot according to claim 1, wherein the inner ring of the ball rolling bearing for taking up centrifugal forces is produced in two distinct portions in order to facilitate the assembly of the blade pivot.

8. The blade pivot according to claim 1, wherein the inner ring of the rolling bearing for taking up transverse forces is shrink-fit to the blade pivot.

9. A blade with variable a pitch setting angle for a turbomachine fan hub comprising an aerodynamic profile and a blade pivot according to claim 1.

10. A turbomachine comprising at least one turbomachine fan hub and at least one assembly of blades with a variable pitch setting angle according to claim 9.

11. A method for assembling a blade pivot according to claim 1 in a turbomachine fan hub, comprising in succession:
    lowering the blade pivot into the turbomachine fan hub;
    clamping the ball rolling bearing for taking up centrifugal forces by screwing the clamping nut onto the external thread of the blade pivot;
    mounting the rolling bearing for taking up transverse forces on the inner radial end of the blade pivot;
    mounting the pitch setting transmission ring inside the inner radial end of the block; and
    locking of said pitch setting transmission ring on the block.

* * * * *